Sept. 27, 1938. R. E. GREENHOLTZ ET AL 2,131,319
METHOD AND APPARATUS FOR MAKING COMPOSITE CAPS
Filed Jan. 3, 1933
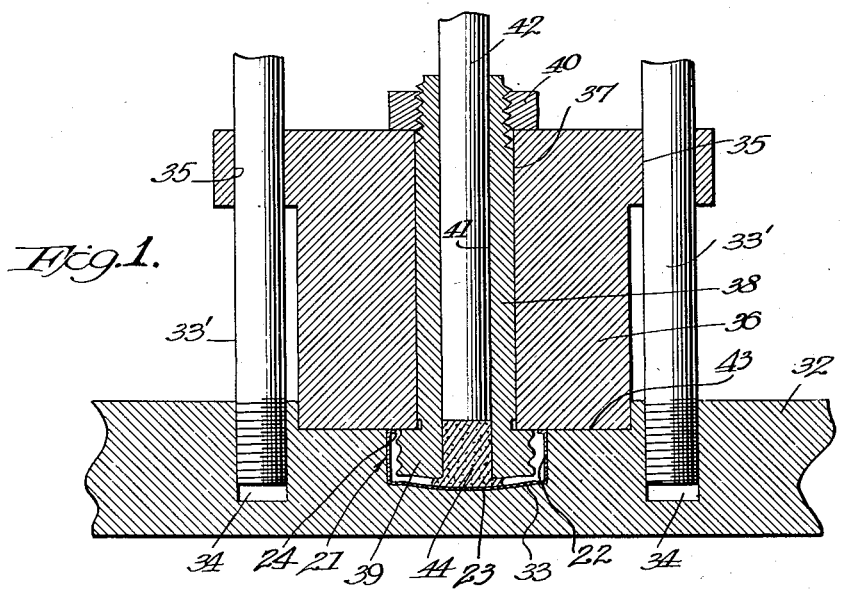
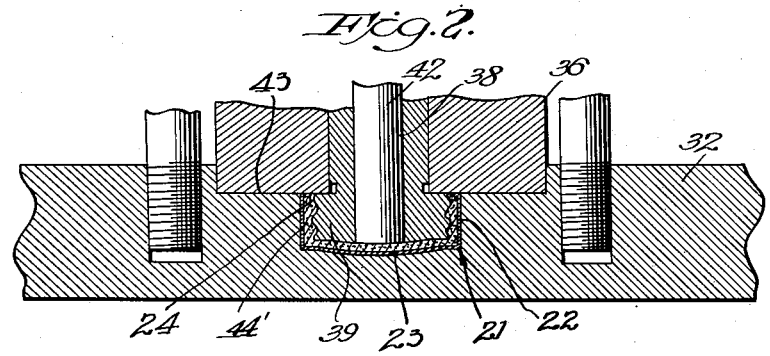
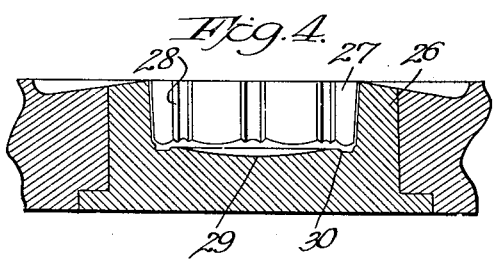
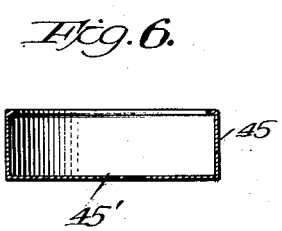
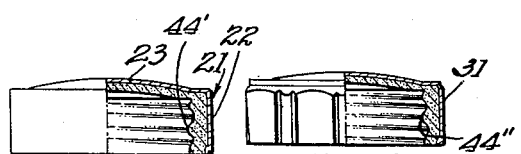
Inventor
Ralph E. Greenholtz
Edward M. Enkur Patented Sept. 27, 1938

2,131,319

UNITED STATES PATENT OFFICE 2,131,319

METHOD AND APPARATUS FOR MAKING COMPOSITE CAPS

Ralph E. Greenholtz and Edward M. Enkur, Baltimore, Md., assignors to Crown Cork & Seal Company, Inc., Baltimore, Md., a corporation of New York Application January 3, 1933, Serial No. 650,025

4 Claims. (Cl. 18—30)

The present invention relates to method and apparatus for making composite skirted closure caps and has particularly to do with the manufacture of such closures wherein a plastic body serves as a liner for a reinforcing element which is preferably of metal.

According to the present invention, the plastic substance is shaped as a liner for the preferably cup-shaped strengthening element and is simultaneously provided interiorly with abutment means for locking engagement with cooperating means provided on the neck of a container. As stated, the strengthening element is preferably cup-shaped but it at least comprises a band surrounding the skirt portion of the plastic body. While the reinforcing element will be referred to as being of metal, the invention is not limited to the use of this material, since any other material of the desired characteristics can be used without departure from the invention. The following description and claims should be read with this understanding.

The various phases of the invention are shown in the accompanying drawing which will be hereinafter described as exemplifying the principles of the invention. In the drawing, Figure 1 is a cross sectional view of suitable molding apparatus, the parts being shown in an intermediate position;

Figure 2 is a partial view of the apparatus of Figure 1 with the parts in final position;

Figure 3 is an elevation partly in section of a composite cap made in accordance with the invention;

Figure 4 is a cross sectional view of a modified form of die which may be substituted in the apparatus shown in Figures 1 and 2;

Figure 5 is an elevation partly in section of a closure cap produced with the use of the die of Figure 4; and Figure 6 shows in cross section a slightly different form of reinforcing element from that shown in the other figures.

Referring to the drawing, reference numeral 32 designates a bed having a mold cavity 33 formed therein, the cavity as here shown being of cylindrical form with a concaved bottom wall.

Vertical bolts as at 33', screwed into threaded bores 34 of the bed, slidably engage in bores 35 formed in lateral extensions of a head 36. Head 36 has a vertical bore 37 coaxial with mold cavity 33 and engaged in bore 37 is the shank portion 38 of a male die 38, the die 39 abutting against the bottom of the head and the upper end of the shank, which is threaded, having screwed thereon a nut 40 which abuts the top surface of the head and thus holds die 39 in position. Externally die 39 is configured as the container neck to which the cap is to be applied. As here shown, it is threaded. The die and its shank portion are provided with an axial bore 41 in which is slidable, with a close-running fitting, a plunger 42.

The initial step of the new method is the production of a shell 21 of suitable material such as metal, this shell preferably comprising a cylindrical skirt portion 22 and an end wall 23, the free edge 24 of the skirt being inturned or rolled. The diameter of the skirt portion 22 is such as to enable it to fit snugly in the die cavity 33, the wall 23 being outwardly convexed, in manufacture, so as to conform to the concaved bottom wall of the cavity. The length of the skirt portion 22 is such that when the shell or blank 21 is fully inserted in the cavity 33, the top of edge 24 is flush with the top face of the bed.

With the preformed shell thus disposed in the mold cavity 33, head 36 is lowered to the position shown in Figure 1 wherein it seats in the recess 43 in the bed 32, closing the annular space between die 39 and blank 21. Hereupon, plunger 42 being removed from bore 41, plastic substance 44 is introduced, preferably in the form of a slug, into the bore in sufficient quantity to fill the space between die 39 and the blank. Plunger 42 is then inserted in bore 41 and forced downwardly, thereby distributing the plastic substance around die 39 in highly compressed condition to form a liner 44', the end of this operation being shown in Figure 2. When the plastic material has suitably hardened, head 36 is elevated and the completed cap unscrewed from die 39. The plastic substance is preferably a thermo-plastic, such as a phenolic condensation product, but it will be understood that any other suitable substance known to the art may be used.

It will be understood that the size of die 39 is such relative to the size of blank 21 as to produce a liner of requisite form and strength.

As may be seen in Figure 3, the inturned or rolled edge 24 affords a smooth finish for the outer lower edge of the completed cap and serves also as locking means for the adherent plastic substance.

The cap thus formed gives a good appearance since its skirt portion is not externally deformed to provide threads or other locking abutment means. Such means are formed in the plastic material and the latter, being completely hidden in the preferred form of the cap illustrated, can be of inexpensive quality.

Decorative effects can be applied to the cap exterior during the molding operation by the use of a suitably relieved female mold such as is designated by the reference numeral 26, Figure 4. The die cavity, as here shown, is provided with vertically extending ribs as at 28 and the cavity as a whole is somewhat downwardly convergent. The bottom wall of the cavity is convexed as at 29 and provided with a concentric annular channel 30. During the molding operation as above described, the metal shell 31, Figure 5, is conformed to the cavity 27 with the result as shown in Figure 5, the plastic liner being designated 44''.

Various forms of locking abutments and external conformation may be provided with the use of collapsible and/or separable dies. The present invention is not limited to the simple form of apparatus herein disclosed.

In Figures 1 and 2, the end wall 23 of the shell 21 is assumed to be convexed in original manufacture. While this form of the bottom wall is, of course, not essential to the invention, it can also be obtained during the molding operation in the use of a blank such as is shown at 45 in Figure 6, this blank having a plane end wall 45' which is forced into conformation with the concaved bottom wall of the female die cavity by the pressure exerted on the inner surface thereof during the molding operation.

A fairly satisfactory article results with the use of a reinforcing band such as skirt portion 22 without the end wall 23. Under these conditions, the skirt portion of the molded body would be as effectively reinforced as before, but the top of the cap would be constituted solely by the thickness of plastic substance. On the other hand, with the use of the cup-shaped blank as described, the end wall of plastic substance may be more or less eliminated, it being merely essential to the invention that the skirt portion of the shell be lined with a united ring of plastic substance of such thickness as to be able to take the required conformation.

The external metal shell may, of course, be lacquered and printed or otherwise decorated as desired and, as above stated, is of particularly good appearance, due to the absence of mutilating locking provisions. The locking provisions, at the same time, are substantially as effective as though formed in the metal itself, and it will be evident that the cap as a whole is of a relatively simple nature so as to be cheaply manufactured.

It will be understood that we do not limit ourselves as to details of the finished cap or as to the method and means of manufacture. Many variations are possible within the scope of the following claims which define the invention.

We claim:—

1. The method of producing a composite closure cap for containers having necks formed with external locking abutment means, said method comprising forming a cup-shaped metal shell, introducing into the shell in spaced relation to the walls thereof a die externally shaped as said locking abutment means, closing the annular space between the die and the shell, forcing plastic substance into the space between the die and shell to form a liner for the latter adherent thereto upon hardening and having pressure-developed interior abutment means for locking engagement with the abutment means on the container neck, and removing the die.

2. Means for molding a closure cap or the like, said means comprising a bed and a head movable toward and away from the bed, said bed having a die cavity therein, a male die portion on said head and movable with the latter, means guiding the head so that at the end of its movement toward the bed, said die portion will be positioned in said cavity in spaced relation to the walls of the latter, said die portion having an opening therethrough through which plastic substance may be introduced into the space between the male die portion and the walls of the cavity, and means closing the annular space between the male die portion and the cavity walls when said die portion is operatively positioned in said cavity.

3. Means for molding a closure cap or the like, said means comprising a bed and a head movable toward and away from said bed, said bed having a die cavity therein, a male die portion having a shank portion engaged in said head, means guiding the head so that at the end of its movement toward the bed, said die portion will be positioned in said cavity in spaced relation to the walls of the latter when the head is moved toward the bed, said die and shank portions having an opening therethrough through which plastic substance may be introduced into the space between the male die portion and the walls of the cavity, and means closing the annular space between the male die portion and the cavity walls when said die portion is operatively positioned in said cavity.

4. The method of producing a composite closure cap for containers having necks formed with external locking abutment means, said method comprising forming a cup-shaped metal shell, placing the shell in a confining cavity in a female die, introducing into the shell in spaced relation to the walls of the latter a male die externally shaped as said locking abutment means, closing the annular space between the male die and the shell; forcing plastic substance into the space between the die and shell to form an adherent liner for the latter, to conform said liner to the male die to form thereon pressure-developed interior abutment means for locking engagement with the abutment means on the container neck, and to conform the shell to said die cavity, the die cavity being of such shape as to impart a decorative configuration to the shell; and removing the shell and adherent hardened liner from the dies.

RALPH E. GREENHOLTZ.
EDWARD M. ENKUR.